United States Patent
Nishikawa et al.

(10) Patent No.: US 6,415,840 B1
(45) Date of Patent: *Jul. 9, 2002

(54) PNEUMATIC SAFETY TIRE WITH RUBBER-ORGANIC FILAMENT FIBER LAYER

(75) Inventors: Tomohisa Nishikawa, Tokyo; Shungo Ito, Saitama-ken; Katsuhiko Kinoshita, Okayama-ken; kenji Matsuo; Kazuomi Kobayashi, both of Tokyo, all of (JP)

(73) Assignee: Bridgestone Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/976,091

(22) Filed: Nov. 21, 1997

(30) Foreign Application Priority Data

May 26, 1997 (JP) .............................................. 9-134890
Nov. 4, 1997 (JP) .............................................. 9-301971

(51) Int. Cl.⁷ .............................. B60C 9/00; B60C 9/04; B60C 17/00
(52) U.S. Cl. ........................ 152/458; 152/517; 152/555
(58) Field of Search ................................. 152/458, 517, 152/555, 543

(56) References Cited

U.S. PATENT DOCUMENTS

| | | | | |
|---|---|---|---|---|
| 3,013,599 A | * | 12/1961 | Riggs ......................... | 152/543 |
| 3,050,098 A | * | 8/1962 | Grote ......................... | 152/458 |
| 3,077,915 A | * | 2/1963 | Weber ........................ | 152/458 |
| 3,254,694 A | * | 6/1966 | Sparks et al. ............... | 152/543 |
| 3,752,720 A | * | 8/1973 | Hamacher et al. .......... | 152/543 |
| 3,982,578 A | * | 9/1976 | Wild .......................... | 152/458 |
| 4,067,372 A | * | 1/1978 | Masson ...................... | 152/458 |
| 4,807,682 A | * | 2/1989 | Imai et al. .................. | 152/557 |
| 5,217,549 A |   | 6/1993 | Johnson ..................... | 152/517 |
| 5,467,807 A | * | 11/1995 | Neddenriep et al. ........ | 152/543 |

FOREIGN PATENT DOCUMENTS

| | | | | |
|---|---|---|---|---|
| EP | 0719662 A | * | 7/1996 | ................ 152/458 |
| JP | 61-110608 |   | 5/1986 | |
| JP | 2-283508 |   | 11/1990 | |
| JP | 3143710 A |   | 6/1991 | |
| JP | 4154411 A |   | 5/1992 | |
| JP | 5238215 |   | 9/1993 | |
| JP | 5-286319 |   | 11/1993 | |
| JP | 5-310013 | * | 11/1993 | ................ 152/517 |
| JP | 08118925 A |   | 5/1996 | |
| JP | 9-048219 |   | 2/1997 | |

* cited by examiner

Primary Examiner—Michael W. Ball
Assistant Examiner—Barbara J. Musser
(74) Attorney, Agent, or Firm—Sughrue Mion, PLLC

(57) ABSTRACT

The present invention provides a pneumatic safety tire comprising a pair of left and right bead cores, a carcass layer, a multi-layer belt portion, a tread portion, and a pair of side wall portions disposed at the left and right of said tread portion, wherein at least one sheet of a rubber-filament fiber composite formed from filament fibers and a rubber component is disposed at said side wall portions in a vicinity of said carcass layer.

The safety tire of the present invention maintains the properties during ordinary use under the inflated condition at high levels, has a light weight, and shows remarkably improved properties during use under the run-flat condition.

23 Claims, 5 Drawing Sheets

STRUCTURE I

STRUCTURE II

STRUCTURE III

STRUCTURE IV

STRUCTURE V

STRUCTURE VI

STRUCTURE VII

STRUCTURE VIII

STRUCTURE IX

STRUCTURE X

STRUCTURE XI

STRUCTURE XII

STRUCTURE XIII

STRUCTURE XIV

STRUCTURE XV

PNEUMATIC SAFETY TIRE WITH RUBBER-ORGANIC FILAMENT FIBER LAYER

BACKGROUND OF THE INVENTION

1. Field of the Invention

The present invention relates to a pneumatic safety tire which is reinforced at side portions and enables satisfactory use under the run-flat condition.

2. Description of Related Art

As tires which are pneumatic and can be used under the run-flat condition (these tires are referred to as pneumatic safety tires) or tire wheels having the same property, tires of an internal wheel type in which an annular internal wheel made of a metal or a synthetic resin is attached to a rim in the pneumatic chamber of the tire and tires of a side reinforced type in which portions of side walls from bead parts to shoulder areas are reinforced by layers made of relatively hard rubber having a crescent-shaped cross-section disposed at an inner side of a carcass (Structure I in FIG. 2) have been known. Between tires of these two types, tires of the internal wheel type have been regarded as useful to some degree for vehicles for transportation of goods and military vehicles which are not particularly required to have a good riding quality. Tires of the side reinforced type have been regarded as useful to some degree for passenger cars which are loaded with a relatively light weight and are required to have a good riding quality its important property/quality.

In a tire of the side reinforced type, the tire is reinforced by a relatively hard reinforcing rubber layer having a crescent-shaped cross-section disposed at the inner side of the side wall in such a manner that an end portion of the reinforcing rubber layer overlaps belt layers, with the carcass being between the belt layers and the reinforcing layer, and another end portion overlaps a rubber filler. When the tire is punctured during use and pressurized air is lost, the weight is supported by the rigidity which is inherent to the side walls reinforced with the reinforcing rubber layer, and the vehicle can be driven in specified distance under the run-flat condition although the speed of the vehicle must be somewhat decreased.

As described above, various safety tires of the side reinforced type have heretofore been proposed. However, most of the proposed tires are used as ultra-low profile high performance tires, i.e., tires having a low aspect ratio and used for vehicles having a relatively small axle load, such as sports cars, but those tires do not show sufficient durability under the run-flat condition. The aspect ratio is expressed as {(height of a tire)/(width of a tire)}×100 under the condition that the tire is attached to a rim, and an ultra-low profile tire is a tire having an aspect ratio less than 60%, such as 30 to 40%.

However, as safety is required increasingly in recent years, safety tires are required also for general use tires for passenger cars which have an aspect ratio of 60% or more.

Although a load applied to a tire is relatively small in the case of a general use tire for passenger cars, the load per one tire may be as large as 500 kgf in the case of larger passenger cars. In such a case, deformation of side walls under the condition of puncture is increased, and the side walls are completely buckled under a dynamic load which is formed by driving and is several times as large as that under the normal condition. This buckling repeatedly takes place during driving. As the result, the bead part in the side wall is pushed up by a flange of the rim, and a covering rubber and a turned-up portion of the carcass which are squeezed between the curved flange and the rubber filler melt or fracture by heat. When this occurs, the tire cannot be used any more even after the part which caused the puncture has been repaired.

As the result of intensive studies comparing ultra-low profile high performance tires and general use tires for passenger cars, the following differences have been found.

a. Because general use tires for passenger cars have larger heights than those of ultra-low profile high performance tires, general use tires show larger deflection under load.

b. Because general use passenger cars generally have larger weights than those of sports cars to which ultra-low profile high performance tires are attached, general use passenger cars cause larger load to the tires.

Because of the characteristics a. and b. described above, the temperature within a tire is not very high when an ultra-low profile high performance safety tire is used under the run-flat condition. In contrast, the temperature within a tire reaches a temperature as high as or higher than 200° C. when a general use size safety tire for passenger cars is used under the run-flat condition. Therefore, it must be considered that the temperature within a tire during use is different depending on the type of the tire.

On the other hand, a decrease in weight of a tire is strongly required in order to decrease the fuel consumption of a vehicle. To decrease weight of a tire, thickness of a side wall of the tire tends to be decreased more. It is required that use under the run-flat condition, i.e., at the internal pressure of the tire of 0 kg/cm$^2$, must be possible, and at the same time, satisfactory properties during ordinary use under an inflated condition are naturally required.

SUMMARY OF THE INVENTION

The first object of the present invention is to provide a pneumatic safety tire having an aspect ratio less than 60% and, exhibiting a small deflection because of its small height and use thereof under a small applied weight, maintaining properties during ordinary use under an inflated condition at high levels, enabling decrease in the weight, and showing remarkably improved properties under the run-flat condition in comparison with those of conventional safety tires having a rubber reinforcing layer.

The second object of the present invention is to provide a pneumatic safety tire having an aspect ratio of 60% or more and, exhibiting a large deflection because of a large height, and use thereof under a large applied weight, maintaining properties during ordinary use under an inflated condition at high levels, enabling decrease in the weight, and showing remarkably improved properties under the run-flat condition in comparison with those of conventional safety tires having a rubber reinforcing layer.

As the result of extensive studies conducted by the present inventors to solve the above problems, particularly on the relation between the side wall portion of a tire and the properties during use under the run-flat condition, it was found that the above objects can be achieved by a layer of a fiber reinforced component which is prepared by covering specific filament fibers with rubber to form an integrated layer (a rubber-filament fiber composite) and disposed at the side wall in a vicinity of a carcass layer and other means as described in the following. The present invention has been completed based on the above knowledge.

An embodiment of the pneumatic safety tire of the present invention relates to a low profile safety tire which has an aspect ratio less than 60% and shows a small deflection because it has a small height and is used under a small applied load (referred to as an embodiment of the low profile tire).

Another embodiment of the pneumatic safety tire of the present invention relates to a general use safety tire for passenger cars which has an aspect ratio of 60% or more and shows a large deflection because it has a large height and is used under a large applied load (referred to as an embodiment of the general use tire).

With respect to both embodiment of the low profile tire and embodiment of the general use tire, (1) the pneumatic safety tire comprises:

a pair of left and right bead ring-shaped cores;

a carcass layer formed from layers in which a plurality of cords disposed parallel to each other are embedded in a covering rubber, both end portions of said carcass layer being folded over said bead cores and turned up such that said carcass layer is formed in an annular shape;

a multi-layer belt portion disposed at an outer side of said carcass portion in a radial direction of the tire;

an annular tread portion disposed at an outer side of said belt portion in the radial direction of the tire;

a pair of side wall portions disposed at the left and right of said tread portion;

wherein at least one sheet of a rubber-filament fiber composite formed from filament fibers and a rubber component is disposed at said side wall portions in a vicinity of said carcass layer.

With respect to the embodiment of the low profile tire, the present invention also provides:

(2) A pneumatic safety tire described in (1), wherein an aspect ratio of said tire is less than 60%, and at least one sheet of said rubber-filament fiber composite is disposed at said side wall portions in a vicinity of said carcass layer;

(3) A pneumatic safety tire described in (2), wherein said rubber-filament fiber composite is disposed at an inner side of said carcass layer;

(4) A pneumatic safety tire described in (2), wherein said rubber-filament fiber composite is disposed both at an inner side of said carcass layer and between said side wall portions and an outer surface of said carcass layer;

(5) A pneumatic safety tire described in (2), wherein said rubber-filament fiber composite is disposed between said side wall portions and an outer surface of said carcass layer, and a rubber reinforcing layer having a crescent-shaped cross-section is disposed at an inner side of said carcass layer;

(6) A pneumatic safety tire described in (2), wherein said rubber-filament fiber composite is disposed at an inner surface of a rubber reinforcing layer having a crescent-shaped cross-section which is disposed at an inner side of said carcass layer;

(7) A pneumatic safety tire described in (2), wherein 4 to 50% by weight of said rubber-filament fiber composite is the filament fibers; and (8) A pneumatic safety tire described in (2), wherein said rubber-filament fiber composite is formed from a rubber and a non-woven fabric having a weight per area of 10 to 300 g/m$^2$.

With respect to the embodiment of the general use tire, the present invention provides:

(9) A pneumatic safety tire described in (1), wherein an aspect ratio of said tire is 60% or more, and at least one sheet of said rubber-filament fiber composite is disposed at said side wall portions in a vicinity of said carcass layer;

(10) A pneumatic safety tire described in (9), wherein an aspect ratio of said tire is 60% or more, a rubber reinforcing layer having a crescent-shaped cross-section is disposed at an inner side of said carcass layer, and at least one sheet of said rubber-filament fiber composite is disposed at an inner side of said rubber reinforcing layer which is disposed at the inside of said carcass layer;

(11) A pneumatic safety tire described in (10), wherein at least one down carcass layer is additionally disposed between said side wall portions and an outer surface of said carcass layer;

(12) A pneumatic safety tire described in (10), wherein in addition to being disposed at the inner side of said rubber reinforcing layer, said rubber-filament fiber composite is also disposed between said side wall portions and an outer surface of said carcass layer;

(13) A pneumatic safety tire described in (12), wherein at least one down carcass layer is disposed between the outer surface of said carcass layer and said rubber-filament fiber composite which is disposed at the outer side of said carcass layer in the radial direction of said tire;

(14) A pneumatic safety tire described in (9), wherein an aspect ratio of said tire is 60% or more, a rubber reinforcing layer having a crescent-shaped cross-section is disposed at an inner side of said carcass layer, and at least one sheet of said rubber-filament fiber composite is disposed between said side wall portions and an outer surface of said carcass layer;

(15) A pneumatic safety tire described in (14), wherein at least one down carcass layer is additionally disposed between the outer surface of said carcass layer and said rubber-filament fiber composite which is disposed at the outer side of said carcass layer in the radial direction of said tire;

(16) A pneumatic safety tire described in (9), wherein 4 to 50% by weight of said rubber-filament fiber composite is the filament fibers, and the filament fibers are fibers which do not exhibit meltability when the tire is used under a run-flat condition;

(17) A pneumatic safety tire described in (9), wherein said rubber-filament fiber composite is formed from a rubber and a non-woven fabric having a weight per area of 10 to 300 g/m$^2$, and the filament fibers do not exhibit meltability when the tire is used under a run-flat condition;

(18) A pneumatic safety tire described in (9), wherein the filament fibers in said rubber-filament fiber composite do not exhibit meltability at 270° C. or lower;

(19) A pneumatic safety tire described in (18), wherein the filament fibers are at least one type of fibers selected from the group consisting of polyester fibers, aramide fibers, polyimide fibers, carbon fibers, glass fibers, and steel fibers; and

(20) A pneumatic safety tire described in (1), wherein said rubber-filament fiber composite is formed from a rubber component and filaments having a diameter or a maximum cross-sectional dimension of 0.0001 to 0.1 mm and a length of 8 mm or more, and said rubber filament fiber composite has a thickness of 0.05 to 2.0 mm.

DESCRIPTION OF THE PREFERRED EMBODIMENTS

Figure 1:
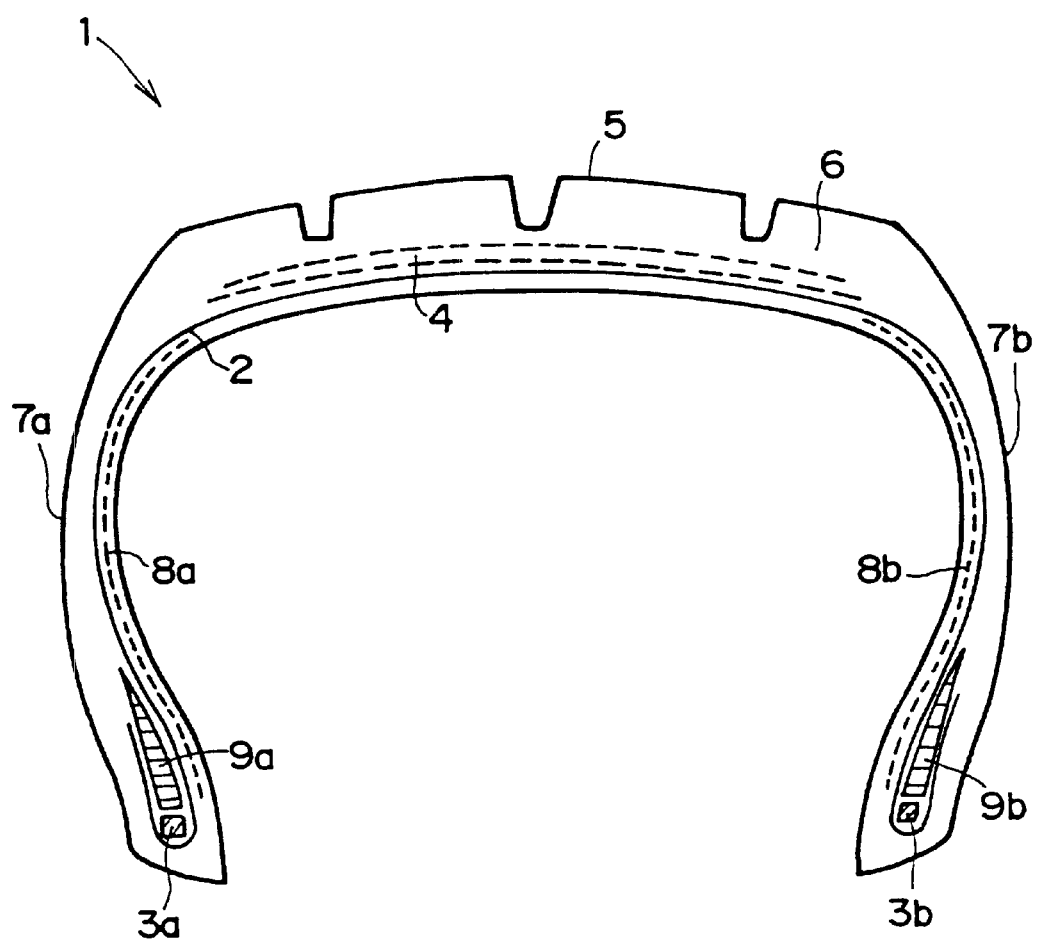
FIG. 1 shows a schematic sectional view of a pneumatic safety tire as an example of the embodiment of the low profile tire of the present invention.

In the present invention, the filament fiber used in the rubber-filament fiber composite which is used as a layer of a fiber reinforcing component is not formed into twisted or woven bundles of a number of fibers like cord fabric for tire cords, and a non-woven fabric is preferably used.

As the process for producing a non-woven fabric, the carding process, the paper making process, the air lay process, the melt blow process, or the spun bond process can be used. A web is prepared by any one of these processes. As a process for binding fibers in any of the processes except for the melt blow process and a span bond process, a heat melting process, a process using a binder, a water entanglement process in which fibers are tangled to each other by using water stream, or a needle punch process in which fibers are tangled to each other by using needles may be used. Particularly, non-woven fabrics obtained by the water entanglement process in which fibers are tangled to each other by using water stream, the needle punch process in which fibers are tangled to each other by using needles, the melt blow process, or the spun bond process are preferably used.

In the present invention, the important fundamental requirements for the rubber-filament fiber composite are that the composite has a structure which allows the rubber to penetrate into parts between the fiber filaments and that the composite has a structure which allows the filament fiber and the rubber to form respective continuous layers in a relatively long distance and in a relatively wide range. It is necessary for satisfying these requirements that the diameter or the maximum cross-sectional dimension of the filament fiber be in the range of 0.0001 to 0.1 mm, preferably in the range of 0.0001 to 0.05 mm. The section of the filament fiber may have a circular shape or a shape other than a circle. The filament fiber may have a hollow structure.

It is necessary that the length of the filament fiber be 8 mm or more, preferably 10 mm or more. When the length of the filament fiber is less than 8 mm, entanglement of filament fibers is not sufficient, and the strength required for a reinforcing layer cannot be maintained.

The filament fibers are not parallel to each other in the non-woven fabric. This follows since as discussed herein, the fiber reinforcing component is not twisted or woven into bundles to form conventional cords.

When the content of the filament fiber in the rubber-filament fiber composite is less than 4% by weight, uniformity cannot be maintained, and the rigidity required for a reinforcing layer cannot be exhibited. Thus, such a content is not preferable. When the content exceeds 50% by weight, the content of the continuous layer of the fiber in the rubber-filament fiber composite is excessively large, and durability of the rubber-filament fiber composite is decreased to cause a decrease in durability of the tire. Thus, such a content is not preferable, either.

When a non-woven fabric is used, it is necessary that the thickness be in the range of 0.05 to 2.0 mm, preferably 0.1 to 0.5 mm, (measured under the pressure of 20 g/cm$^2$) and that the weight per area (the weight per 1 m$^2$) be preferably in the range of 10 to 300 g, more preferably in the range of 10 to 100 g. When the thickness of the non-woven fabric is less than 0.05 mm, maintaining uniformity of the non-woven fabric becomes difficult, and a composite prepared from the non-woven fabric and rubber has insufficient strength and rigidity. When the thickness exceeds 2.0 mm, thickness of a composite prepared from the non-woven fabric and rubber is increased to cause inferior uniformity and workability, and such a material is not preferable as a component of a tire. When the weight per area is less than 10 g/m$^2$, uneven non-woven fabric is obtained because maintaining uniformity of the non-woven fabric itself becomes difficult, and a composite prepared from the non-woven fabric and rubber shows large random variations in strength, rigidity, and elongation at break after the composite is vulcanized. Thus, such a weight per area is not preferable. When the weight per area exceeds 300 g/m$^2$, rubber tends not to penetrate into the space inside the non-woven fabric although the penetration may be different depending on fluidity of the rubber. Such a weight per area is not preferable from the standpoint of separation between the fabric and the rubber of the layer of the fiber reinforcing component which is the rubber-non-woven fabric composite when the composite is used as a component of a tire.

As described above, the fiber reinforcing component is used in the pneumatic safety tire of the present invention. However, it is necessary that the light weight of the tire be kept unaffected by the use because decrease in fuel consumption can be expected by maintaining the light weight.

In the embodiment of the low profile tire of the present invention, it is preferable that a fiber used as the filament fiber does not exhibit meltability under the run-flat condition for this pneumatic safety tire. The low profile safety tire shows small deflection because it has a small height and is used under a small applied load, and the temperature within the tire is not so high as that of a general use tire under the run-flat condition. Therefore, the melting point or the softening point of a selected filament fiber can be held lower than that of a filament fiber used for a general use safety tire. As for the material of the filament fiber, one or a plurality of fibers selected from natural macromolecular fibers, such as cotton, rayon, and cellulose; synthetic macromolecular fibers, such as aliphatic polyamide fibers, polyester fibers such as polyethylene terephthalate (PET) fibers, polyvinyl alcohol fibers, polyimide fibers, and aramide fibers; carbon fibers; glass fibers; and steel fibers may be used by themselves or in combination with any of the above fibers. Among these fibers, PET fibers are preferable because the necessary functions are sufficiently exhibited without melting or softening under the run-flat condition of the low profile safety tire and also because they are organic fibers and therefore light weight. A filament fiber having a multilayer structure in which different materials are used in adjacent layers may also be used. Moreover, composite fibers having a core-shell structure in which different materials are used in an outer layer and in an inner layer, a radiate structure, a petal structure, or a layered structure may also be used.

In the embodiment of the general use tire of the present invention, it is preferable that a fiber used as the filament fiber does not exhibit meltability under the run-flat condition for this pneumatic safety tire. When a composite which is applied to the embodiment of the low profile tire as a component for suppressing blow failure of a rubber material, deflection, and propagation of crack, such as a rubber-filament fiber composite using PET fiber, is used for the embodiment of the general use tire, it occasionally occurs that the PET fiber softens or melts and does not exhibit sufficient function because the temperature within the tire becomes higher. The material of the filament fiber used for the embodiment of the general use tire, may be a fiber selected from the group consisting of fibers which do not exhibit meltability at or below 270° C., such as aramide fibers, rayon fibers, oxidized acrylic fibers (formed by baking polyacrylonitrile fibers; precursors of carbon fiber), polyester fibers such as polyethylene naphthalate fibers, polyimide fibers, carbon fibers, glass fibers, and steel fibers, can be used. Among these fibers, aramide fibers, rayon fibers, and oxidized acrylic fibers are more preferable. The fiber may be used singly or as a mixture of a plurality of fibers. A filament fiber having a multi-layer structure in which different materials are used in adjacent layers may also be used. Moreover, composite fibers having a core-shell structure in which different materials are used in an outer layer and in an inner layer, a radiate structure, a petal structure, or a layered structure may also be used.

In the embodiment of the general use tire of the present invention, when a safety tire of a general use tire size is used under the run-flat condition, the temperature inside the tire becomes as high as or higher than, for example, 200° C. because of a large deflection, and a fiber which softens or melts at 270° C. or lower cannot exhibit sufficient functions. Therefore, a fiber which does not exhibit meltability at 270° C. or lower is preferably used in the embodiment of the general use tire of the present invention. The fiber which does not exhibit meltability at 270° C. or lower means a fiber having a melting point of 270° C. or higher when the fiber is crystalline and a fiber which does not exhibit fluidity at 270° C. or lower when the fiber is amorphous.

When a tire is prepared by using the rubber-filament fiber composite comprising the fiber used in the present invention, heat generated by the tire is decreased because of the decreased deflection of the tire, and moreover an effect of suppressing formation of cracks into the disposed rubber reinforcing layer is exhibited. Thus, durability under the run-flat condition is enhanced.

The rubber component used in the rubber-filament fiber composite is not particularly limited. Examples of the rubber component include natural rubber (NR), butadiene rubber (BR), styrene-butadiene rubber (SBR), and isoprene rubber (IR). Among these rubber components, natural rubber and butadiene rubber are preferable.

To compose of the filament fiber and the rubber in the fiber reinforcing component layer used in the present invention, an unvulcanized rubber composition is applied to the fiber in advance while the components remain unvulcanized. Specifically, mixing in the preparation of a rubber sheet may be conducted by using any method generally used in the rubber industry, such as a method using a roll or a Banbury mixer. It is preferable from the standpoint of dispersion of the fiber that the filament fiber is added in small portions. When a non-woven fabric is used, an unvulcanized rubber composition of a sheet form is pressed to one or both faces of the non-woven fabric by using a press or a roll so that the air contained inside the non-woven fabric is sufficiently replaced with the unvulcanized rubber composition. When the fluidity of the unvulcanized rubber composition is not sufficient, it may be necessary that the unvulcanized rubber composition is pressed under an increased temperature condition within the range that vulcanization does not start substantially. In another method, the unvulcanized rubber is liquefied by using a solvent and applied to the non-woven fabric to provide the fabric with tackiness. The unvulcanized composite thus obtained is applied as the fiber reinforcing component to prepare a green tire, which is then vulcanized in a mold.

In the formation of the composite, the fiber may be used without any adhesive treatment in advance when the adhesion to rubber is sufficient after vulcanization. However, when the adhesion is insufficient, the dipping heat set treatment may be applied to the filament fiber in a similar manner to that used for enhancement of adhesion between fiber codes for tires and rubber.

Because of the above characteristics, the safety tire prepared by using a rubber-filament fiber composite shows a remarkably increased durability under the run-flat condition in comparison with conventional safety tires in which a rubber reinforcing layer having a crescent-shaped cross-section alone is disposed on the inner surface of the carcass layer.

The above effects can be obtained independently of the place where the rubber-filament fiber composite is disposed. However, a more enhanced effect is obtained when the composite is disposed at an inner side of the carcass. The more enhanced effect is considered to arise because, when the composite is disposed at an outer side of the carcass, the effect of suppressing crack to the disposed rubber reinforcing layer is decreased although the durability under the run-flat condition is enhanced by the effect of suppressing deflection.

EXAMPLES

I. The embodiment of the low profile tire of the pneumatic safety tire of the present invention is described in the following with reference to Figures, Examples, and Comparative Examples.

An example of the schematic sectional view of this pneumatic safety tire is shown in FIG. 1.

A carcass layer 2 has a single layer in which cords are arranged to the radial directions of the tire 1, and both end portions of the carcass layer are folded over a pair of the left and right bead wires 3a and 3b and turned up. A steel belt 4 having two layers is disposed in a ring shape at the upper side of the carcass layer 2 in a radial direction of the tire. A tread rubber 6 is disposed at the tread portion 5 of the tire at the upper side of the steel belt. Side wall rubbers 7a and 7b are disposed on the carcass layer at both sides of the tread rubber 6. In this example, layers of the fiber reinforcing component 8a and 8b are disposed on the inner surface of the carcass layer 2 at the side walls and extend from the side of bead fillers 9a and 9b to the vicinity of the end portion of the belt layer having the maximum width of all of the belt layers.

In Structures II, III, IV, and V shown in FIGS. 2B to 2E, examples of the layout of reinforcing components in the tire side part of the pneumatic safety tire of the embodiment of the low profile tire of the present invention are shown.

In Structure II, a layer of a fiber reinforced component 8 of the rubber-filament fiber composite is disposed on the inner surface of the carcass layer. In Structure III, a layer of a fiber reinforced component 8 is disposed between the side wall rubber 7 and the carcass layer 2, and a rubber reinforcing layer which has a crescent-shaped cross-section and a smaller thickness than those used for the conventional tires (the maximum thickness: 3 mm, Shore hardness: 80 degrees) is disposed on the inner surface of the carcass layer 2. In Structure IV, a layer of a fiber reinforced component 8 is disposed on both inner and outer surfaces of the carcass layer 2 at the side wall. In Structure V, a rubber reinforcing layer which has a crescent-shaped cross-section and a smaller thickness than those used for the conventional tires (the maximum thickness: 3 mm, Shore hardness: 80 degrees) is disposed on the inner surface of the carcass layer 2, and a layer of a fiber reinforced component 8 is disposed on the inner surface of this rubber reinforcing layer.

Figure 2A:
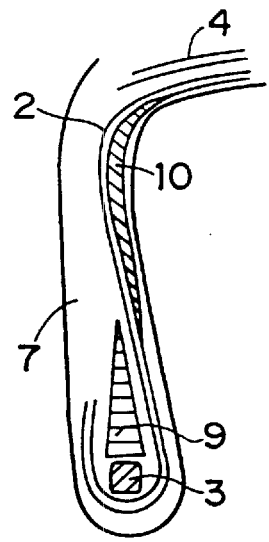
FIGS. 2A through 2E show schematic representations each exhibiting a layout of various reinforcing components in a side portion of a pneumatic safety tire used in an Example of the embodiment of the low profile tire of the present invention or in a Comparative Example.
Figure 2B:
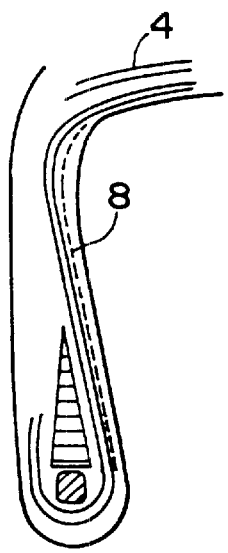
Figure 2C:
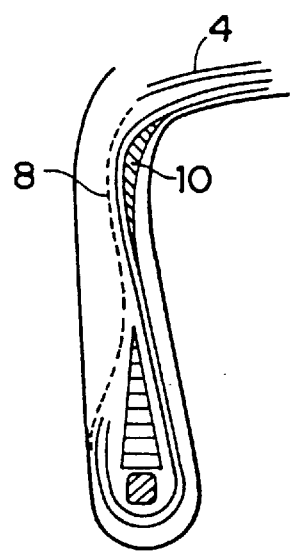
Figure 2D:
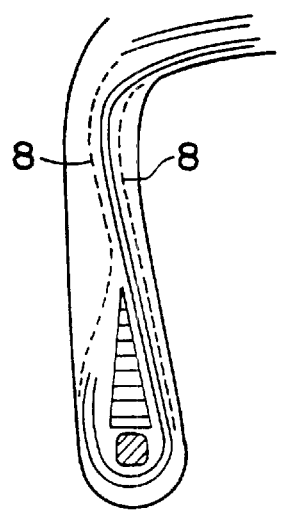
Figure 2E:
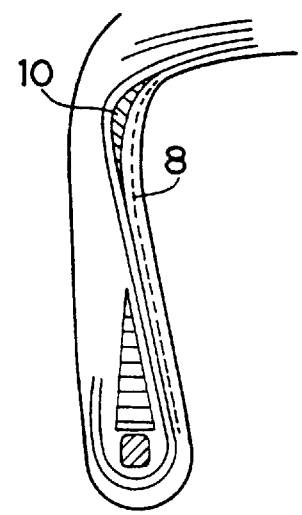

A layout of reinforcing components in a conventional tire is shown in Structure I in FIG. 2A for comparison with the layouts of reinforcing components in the above embodiments of the low profile tire of the present invention. In Structure I, a conventional rubber reinforcing layer having a crescent-shaped cross-section (the maximum thickness: 7 mm, Shore hardness: 80 degrees) is disposed on the inner surface of the carcass 2 in place of the above layer of the fiber reinforced component.

Methods of evaluation used in the following Examples and Comparative Examples are as follows:

Durability Under the Run-flat Condition

A tire was attached to a rim and inflated to an internal pressure of 3.0 kg/cm$^2$. After the tire was placed in a chamber at a room temperature of 38° C. for 24 hours, the core of the valve was removed to decrease the internal pressure to 0 kg/cm$^2$. Then, the drum driving test of the tire was conducted under the condition of an applied weight of 400 kg, a speed of 80 km/hour, and a room temperature of 38° C. Durability under the run-flat condition was obtained from the driving distance at the time that the fracture occurred. Durability under the run-flat condition in Examples 1 to 5 is shown as indices with reference to the value obtained in Comparative Example 1 which is set to 100.

Durability Under the Inflated Condition

A tire was attached to a rim and inflated to an internal pressure of 3.0 kg/cm$^2$. After the tire was placed in a chamber at a room temperature of 25° C. for 24 hours, the internal pressure was adjusted again to 3.0 kg/cm$^2$. Then, the tire was pressed to a drum rotating at a circumferential speed of 60 km/hour under an applied load which was twice the load specified by the Japanese Association of Tire Manufacturers, and the driving distance at the time that the fracture occurred was measured. To decide whether the tire can actually be used, the result was rated as × (cannot be used) when the driving distance was 20,000 km or less, and as ○ (can be used) when the driving distance exceeded 20,000 km.

Examples 1 to 5 and Comparative Example 1

The rubber composition used for the rubber layer in the rubber-filament fiber composites and rubber reinforcing layers was prepared in accordance with the formulation shown in Table 1. Materials used for reinforcing components and layouts of reinforcing components are shown in Table 2. The carcass consisted of two carcass plies made with rayon cords which were made of ply-twisted fibers of 1840 decitex. Low profile tires of size 265/35ZR18 were obtained by using these components. Durability under the run-flat condition, durability under the inflated condition, and the weight (as an index of the light weight) of the tires were measured. The results are shown in Table 2.

TABLE 1

| | parts by weight |
|---|---|
| rubber component | 100 |
| natural rubber | 25 |
| BR01[1] | 75 |
| carbon black (FEF) | 55 |
| spindle oil | 2.5 |
| zinc oxide | 5 |
| stearic acid | 1 |
| antioxidant[2] | 2 |
| vulcanization accelerator[3] | 3.5 |
| sulfur | 6 |

[1] Manufactured by JAPAN SYNTHETIC RUBBER Co., Ltd.
[2] NOCRAC 6C (a trade name, manufactured by OUCHI SHINKO KAGAKU Co., Ltd.)
[3] NOCCELER NS (a trade name, manufactured by OUCHI SHINKO KAGAKU Co., Ltd.)

TABLE 2

| | Comparative Example 1 | Example 1 | Example 2 | Example 3 | Example 4 | Example 5 |
|---|---|---|---|---|---|---|
| reinforcing component | | | | | | |
| reinforcing rubber layer | used | not used | used | not used | used | not used |
| rubber-filament fiber composite | | | | | | |
| thickness of the composite (mm) | — | 0.9 | 0.9 | 0.9 | 0.9 | 0.9 |
| form of fiber | — | non-woven fabric | non-woven fabric | non-woven fabric | non-woven fabric | fiber[1] |
| type of fiber | — | PET | PET | PET | PET | PET |
| length of fiber (mm) | — | 50 | 50 | 50 | 50 | 50 |
| diameter of fiber (mm) | — | 0.02 | 0.02 | 0.02 | 0.02 | 0.02 |
| weight per area of non-woven fabric (g/m$^2$) | — | 40 | 40 | 40 | 40 | — |
| thickness of non-woven fabric (mm) | — | 0.3 | 0.3 | 0.3 | 0.3 | — |
| layout of reinforcing components[2] (FIG. 2) | St I 2P st | St II 2P st | St III 2P st | St IV 2P st | St V 2P st | St V 2P st |
| durability under the run-flat condition (index) | 100 | 110 | 100 | 160 | 160 | 160 |
| durability under the inflated condition | ○ | ○ | ○ | ○ | ○ | ○ |
| weight of tire (kg) | 13.4 | 12.4 | 13.0 | 12.7 | 13.0 | 13.0 |

[1] Fiber was not used as a non-woven fabric but mixed into rubber without forming (content of fiber: 20% by weight).
[2] St: Structure, st: structure.

II. The embodiment of the general use tire of the pneumatic safety tire of the present invention is described in the following with reference to Figures, Examples, and Comparative Examples.

Figure 3:
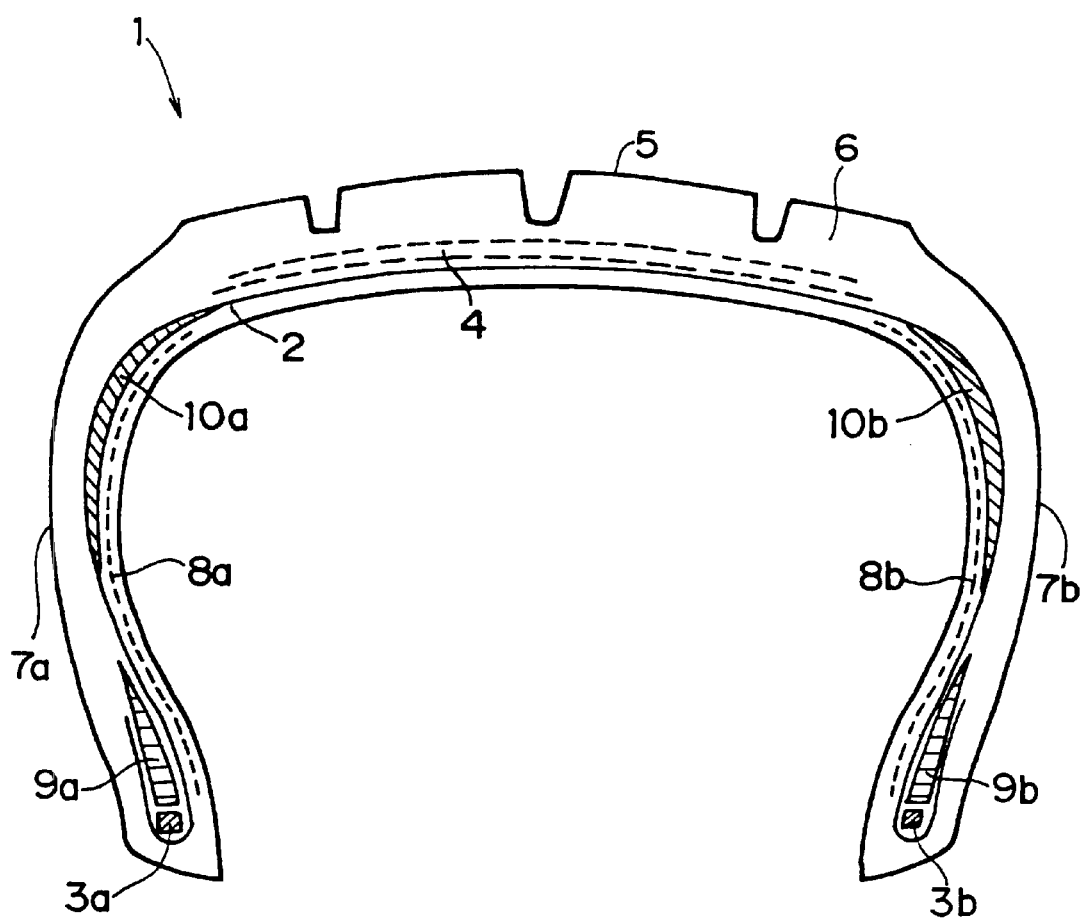
FIG. 3 shows a schematic sectional view of a pneumatic safety tire as an example of the embodiment of the general use tire of the present invention.

An example of the schematic sectional view of this pneumatic safety tire is shown in FIG. 3.

A carcass layer 2 has a single layer in which cords are arranged to the radial directions of the tire 1, and both end portions of the carcass layer are folded over a pair of the left and right bead wires 3a and 3b and turned up. A steel belt 4 having two layers is disposed in a ring shape at the upper side of the carcass layer 2 in a radial direction of the tire. A tread rubber 6 is disposed at the tread portion 5 of the tire at the upper side of the steel belt. Side wall rubbers 7a and 7b are disposed on the carcass layer at both sides of the tread rubber 6. In this example, rubber reinforcing layers 10a and 10b having a crescent-shaped cross-section are disposed on the inner surface of the carcass layer 2 at the side wall, and layers of the fiber reinforced component 8a and 8b are disposed on the inner surface of the rubber reinforcing layers and extend from the side of bead fillers 9a and 9b to the vicinity of the end portion of the belt layer having the maximum width of all of the belt layers.

In Structures VII, VIII, IX, XI, XII, XIV, and XV shown in FIGS. 4B, 4C, 4D, 4F, 5A, 5C, and 5D, examples of the layout of reinforcing components in the tire side part of the pneumatic safety tire of the embodiment of the general use tire of the present invention are shown.

In Structure VII, a reinforcing rubber layer 10 having a crescent-shaped cross-section (for example, the maximum thickness: 11 mm, Shore hardness: 80 degrees) is disposed at an inner side of a carcass layer 2a having a 3P carcass structure which has 2 sheets of a turned-up carcass 2a and a single sheet of a down carcass 2b disposed on the outermost layer of the turned-up carcass. Moreover, a layer of a fiber reinforced component 8 of a rubber-filament fiber composite is disposed on the inner surface of the thus formed structure. Structure VIII has a 3P carcass structure and is similar to Structure VII except that a layer of a fiber reinforced component 8 is not disposed on the inner surface of the rubber reinforcing layer as is the case in Structure VII but is disposed at an outer side of the down carcass 2b. Structure IX has a 3P carcass structure and is similar to Structure VII except that a layer of a fiber reinforced component 8 is additionally disposed at an outer side of the down carcass 2b, i.e., that this structure has two layers of a fiber reinforced component. In Structure XI, a rubber reinforcing layer 10 having a crescent-shaped cross-section is disposed at an inner side of a carcass layer 2a having a 2 P carcass structure which has a single sheet of a turned up carcass 2a and a single sheet of a carcass 2a having the end portion turned up to a tread portion. Moreover, a layer of a fiber reinforced component 8 of a rubber-filament fiber composite is disposed on the inner surface of the thus formed structure. Structure XII has a 2P carcass structure and is similar to Structure XI except that a layer of a fiber reinforced component 8 is not disposed at an inner side of the rubber reinforcing layer as is the case in Structure XI but is disposed at an outer side of carcass 2a. Structure XIV has a 1P structure which has a single sheet of a carcass 2a having the end portion turned up to a tread portion. A reinforcing rubber layer 10 and a layer of a fiber reinforced component 8 are disposed at an inner side of the thus formed structure in a manner similar to that in Structure XI. Structure XV has a 1P carcass structure and is similar to Structure XIV except that a layer of a fiber reinforced component 8 is disposed at an outer side of the carcass 2a.

Figure 4A:
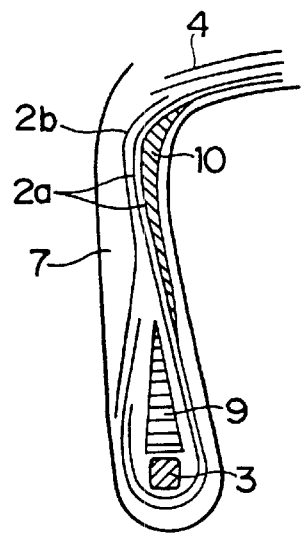
FIGS. 4A through 4F show schematic representations each exhibiting a layout of various reinforcing components in a side portion of a pneumatic safety tire used in an Example of the embodiment of the general use tire of the present invention or in a Comparative Example.
Figure 4B:
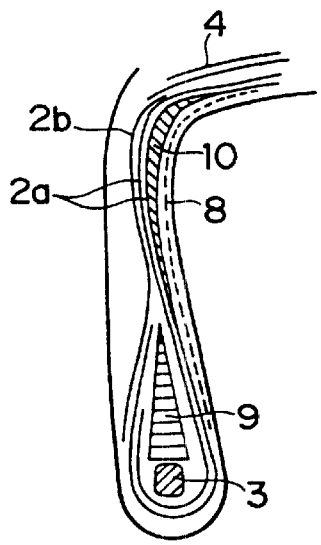
Figure 4C:
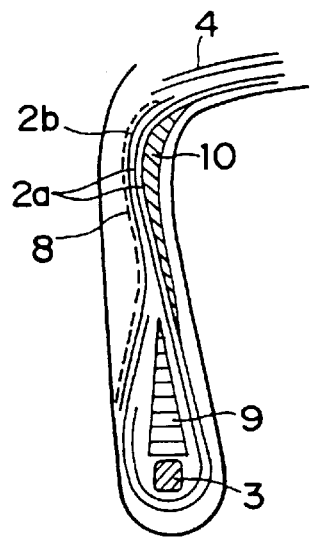
Figure 4D:
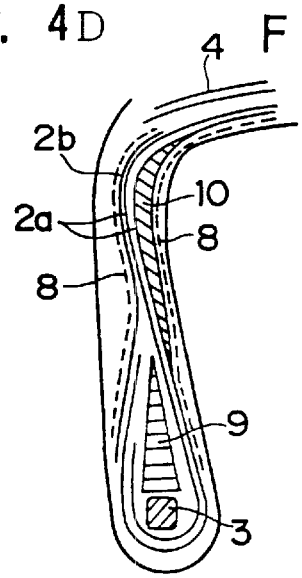
Figure 4E:
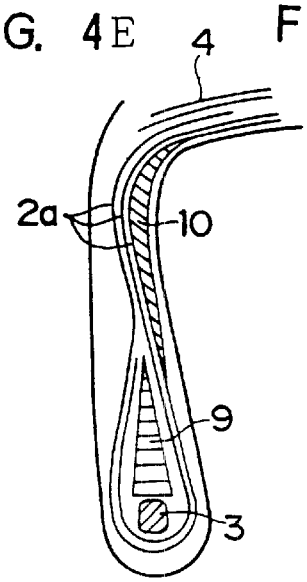
Figure 4F:
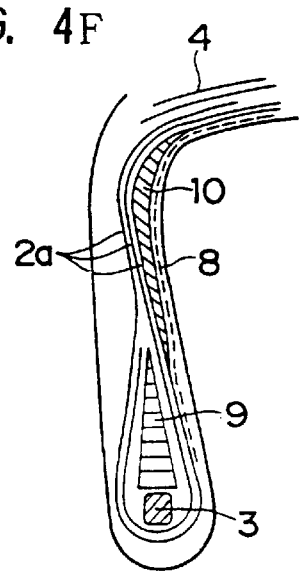
Figure 5A:
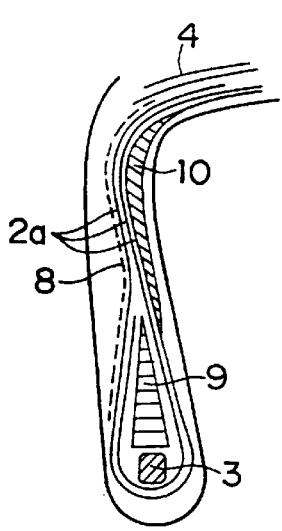
FIGS. 5A through 5D show other schematic representations each exhibiting a layout of various reinforcing component in a side portion of a pneumatic safety tire used in an Example of the embodiment of the general use tire of the present invention or in a Comparative Example.
Figure 5B:
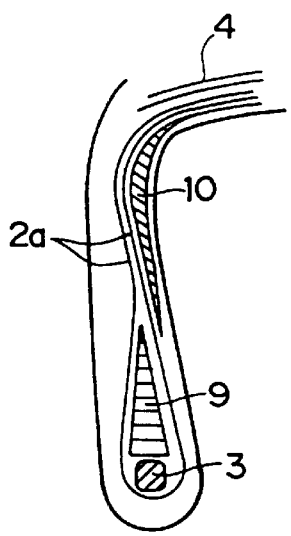
Figure 5C:
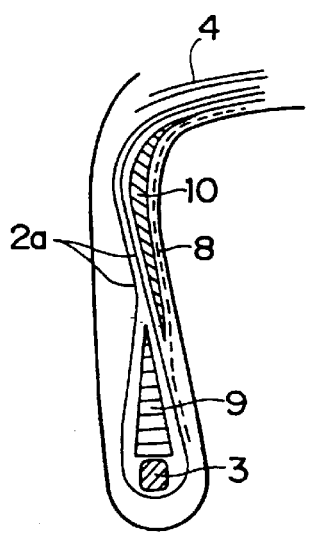
Figure 5D:
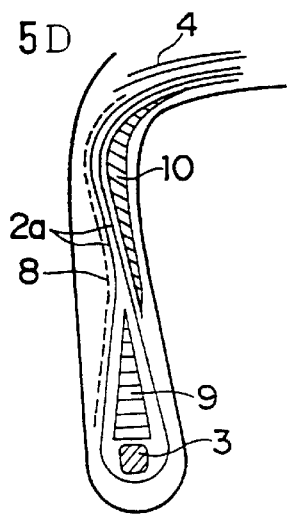

Layouts of reinforcing components in conventional tires are shown in Structures VI, X, and XIII in FIGS. 4A, 4E, and 5B for comparison with the above layouts of reinforcing components of the present invention. Structures VI, X, and XIII are similar to Structures VII, XI, and XIV, respectively, of the embodiments of the general use tire of the present invention except that the layer of a fiber reinforced component 8 of the rubber-filament fiber composite is absent.

Methods of evaluation used in the following Examples and Comparative Examples are as follows:

Durability Under the Run-flat Condition

Durability under the run-flat condition was evaluated in accordance with the same method as that described in I. The embodiment of the low profile tire except that the applied weight was 570 kg and the speed was 89 km/hour. Values of the durability under the run-flat condition in Comparative Example 2 and Examples 1 to 6, in Examples 7 and 8, and in Examples 9 and 10 are shown as indices with reference to the values obtained in Comparative Example 1, 3, and 4, respectively, which are set to 100.

Durability Under the Inflated Condition

Durability under the inflated condition was evaluated in accordance with the same method as that described in I.

Examples 6 to 15 and Comparative Examples 2 to 5

The rubber composition used for the rubber layer in the rubber-filament fiber composites and rubber reinforcing layers was prepared in accordance with the formulation shown in Table 1. Materials used for reinforcing components and layouts of reinforcing components are shown in Tables 3 and 4. Rayon cords which were prepared by twisting two ply-twisted fibers of 1840 decitex were used for the carcass. Ordinary passenger car tires of size 225/60R16 were obtained by using these components. Durability under the run-flat condition, durability under the inflated condition, and the weight (as an index of the light weight) of the tires were measured. The results are shown in Tables 3 and 4.

TABLE 3-1

| Example | | | 6 | 7 |
|---|---|---|---|---|
| Comparative Example | 2 | 3 | | |
| reinforcing component | | | | |
| reinforcing rubber layer | used | used | used | used |
| rubber-filament fiber composite | | | | |
| thickness of the composite (mm) | — | 0.9 | 0.9 | 0.9 |
| form of fiber | — | non-woven fabric | non-woven fabric | non-woven fabric |
| type of fiber | — | PET | aramide | aramide |
| length of fiber (mm) | — | 50 | 50 | 50 |
| diameter of fiber (mm) | — | 0.02 | 0.02 | 0.02 |
| weight per area of non-woven fabric (g/m$^2$) | — | 40 | 50 | 50 |
| thickness of non-woven fabric (mm) | — | 0.3 | 0.3 | 0.3 |
| layout of reinforcing components[2] (FIG. 4) | St VI 3P st | St VII 3P st | St VII 3P st | St VIII 3P st |
| durability under the run-flat condition (index) | 100 | 116 | 130 | 124 |

TABLE 3-1-continued

| Example | | | 6 | 7 |
|---|---|---|---|---|
| Comparative Example | 2 | 3 | | |
| durability under the inflated condition | ○ | ○ | ○ | ○ |
| weight of tire (kg) | 15.4 | 15.7 | 15.7 | 15.7 |

[2] St: Structure, st: structure.

TABLE 3-2

| Example | | | | |
|---|---|---|---|---|
| Comparative Example | 8 | 9 | 10 | 11 |
| reinforcing component | | | | |
| reinforcing rubber layer rubber-filament fiber composite | used | used | used | used |
| thickness of the composite (mm) | 0.9 | 0.9 | 0.9 | 0.9 |
| form of fiber | non-woven fabric | fiber[1] | non-woven fabric | non-woven fabric |
| type of fiber | aramide | aramide | oxidized acrylic | rayon |
| length of fiber (mm) | 50 | 50 | 50 | 50 |
| diameter of fiber (mm) | 0.02 | 0.02 | 0.02 | 0.01 |
| weight per area of non-woven fabric (g/m$^2$) | 50 | — | 50 | 50 |
| thickness of non-woven fabric (mm) | 0.3 | — | 0.3 | 0.3 |
| layout of reinforcing components[2] (FIG. 4) | St IX 3P st | St VII 3P st | St VII 3P st | St VII 3P st |
| durability under the run-flat condition (index) | 140 | 130 | 126 | 126 |
| durability under the inflated condition | ○ | ○ | ○ | ○ |
| weight of tire (kg) | 16 | 15.7 | 15.7 | 15.7 |

[1] Fiber was not used as a non-woven fabric but mixed into rubber without forming (content of fiber: 20% by weight)
[2] St: Structure, st: structure.

TABLE 4

| Example | | 12 | 13 | | 14 | 15 |
|---|---|---|---|---|---|---|
| Comparative Example | 4 | | | 5 | | |
| reinforcing component | | | | | | |
| reinforcing rubber layer rubber-filament fiber composite | used | used | used | used | used | used |
| thickness of the composite (mm) | — | 0.9 | 0.9 | — | 0.9 | 0.9 |
| form of fiber | — | non-woven fabric | non-woven fabric | — | non-woven fabric | non-woven fabric |
| type of fiber | — | aramide | aramide | — | aramide | aramide |
| length of fiber (mm) | — | 50 | 50 | — | 50 | 50 |
| diameter of fiber (mm) | — | 0.02 | 0.02 | — | 0.02 | 0.02 |
| weight per area of non-woven fabric (g/m$^2$) | — | 50 | 50 | — | 50 | 50 |
| thickness of non-woven fabric (mm) | — | 0.3 | 0.3 | — | 0.3 | 0.3 |
| layout of reinforcing components[1] (FIGS. 4 and 5) | St X 2P st | St XI 2P st | St XII 2P st | St XIII 1P st | St XIV 1P st | St XV 1P st |
| durability under the run-flat condition (index) | 100 | 120 | 115 | 100 | 130 | 120 |
| durability under the inflated condition | ○ | ○ | ○ | ○ | ○ | ○ |
| weight of tire (kg) | 14.5 | 14.8 | 14.8 | 13.6 | 13.9 | 13.9 |

[1] St: Structure, st: structure.

As shown in Tables 2, 3, and 4, it is understood that the pneumatic safety tire of the present invention realizes a light weight and shows a remarkably improved property under the run-flat condition while properties such as durability in ordinary use under the inflated condition are maintained at high levels.

The safety tire having the layout of reinforcing components in which the rubber reinforcing layer alone was used (without using the fiber composite) (Comparative Example 1) showed the property under the run-flat condition inferior to that of the embodiments of the low profile tire of the present invention, such as the pneumatic safety tires having the rubber-filament fiber composite (Examples 1, 3, and 5) and the pneumatic safety tires having the rubber reinforcing layer and the rubber-filament fiber composite in combination (Examples 2 and 4).

The safety tire having a layout of reinforcing components (a 3P structure) in which the rubber reinforcing layer alone was used (without using the fiber composite) (Comparative Example 2) and the safety tire having a layer of reinforcing components (a 3P structure) in which the rubber reinforcing layer and a rubber-filament fiber (PET) composite outside the scope of the embodiment of the general use tire of the present invention (Comparative Example 3) showed the property under the run-flat condition inferior to that of the pneumatic safety tires having the reinforcing rubber layer, the rubber-filament fiber composite, and the layout of these reinforcing components (a 3P structure) in accordance with the embodiment of the general use tire of the present invention (Examples 6 to 11). The safety tire having the layout of reinforcing components (a 2P structure) in which the rubber reinforcing layer alone was used (without using the fiber composite) (Comparative Example 4) showed the property under the run-flat condition inferior to that of the pneumatic safety tires having the reinforcing rubber layer, the rubber-filament fiber composite and the layout of these reinforcing components (a 2P structure) in accordance with the embodiment of the general use tire of the present invention (Examples 12 and 13). The safety tire having the layout of reinforcing components (a 1P structure) in which the rubber reinforcing layer alone was used (Comparative Example 5) showed the property under the run-flat condition inferior to that of the pneumatic safety tires having the layout of reinforcing components (a 1P structure) in accordance with the embodiment of the general use tire of the present invention (Examples 14 and 15).

The safety tire of the present invention maintains the properties during ordinary use under the inflated condition at high levels, realizes a light weight, shows remarkably improved properties during use under the run-flat condition in comparison with those of conventional safety tires having a rubber reinforcing layer, and is used as an ultra-low profile high performance tire having an aspect ratio less than 60% and as a general use passenger car tire having an aspect ratio of 60% or more.

What is claimed is:

1. A pneumatic tire comprising:
   a pair of left and right ring-shaped bead cores;
   a carcass layer formed from layers in which a plurality of cords disposed parallel to each other are embedded in a covering rubber, both end portions of said carcass layer being folded over said bead cores and turned up such that said carcass layer is formed in an annular shape;
   a multi-layer belt portion disposed at an outer side of said carcass portion in a radial direction of the tire;
   an annular tread portion disposed at an outer side of said belt portion in the radial direction of the tire;
   a pair of side wall portions disposed at the left and right of said tread portion;
   at least one sheet of a rubber-filament fiber composite formed from a non-woven fabric having a weight per area of 10 to 300 g/m$^2$, said non-woven fabric comprising organic non-parallel filament fibers and a rubber component, said sheet being disposed at least one of said side wall portions in a vicinity of said carcass layer; and
   a rubber reinforcing layer having a crescent-shaped cross-section disposed at an inner side of said carcass layer.

2. A pneumatic safety tire according to claim 1, wherein an aspect ratio of said tire is less than 60%, and at least one sheet of said rubber-filament fiber composite is disposed at said side wall portions in a vicinity of said carcass layer.

3. A pneumatic safety tire according to claim 2, wherein said rubber-filament fiber composite is disposed at an inner side of said carcass layer.

4. A pneumatic safety tire according to claim 2, wherein said rubber-filament fiber composite is disposed both at an inner side of said carcass layer and between said side wall portions and an outer surface of said carcass layer.

5. A pneumatic safety tire according to claim 2, wherein said rubber-filament fiber composite is disposed between said side wall portions and an outer surface of said carcass layer, and a rubber reinforcing layer having a crescent-shaped cross-section is disposed a at an inner side portion of said carcass layer.

6. A pneumatic safety tire according to claim 2, wherein said rubber-filament fiber composite is disposed at an inner surface of a rubber reinforcing layer having a crescent-shaped cross-section which is disposed at an inner side of said carcass layer.

7. A pneumatic safety tire according to claim 2, wherein 4 to 50% by weight of said rubber-filament fiber composite is the filament fibers.

8. A pneumatic safety tire according to claim 1, wherein an aspect ratio of said tire is 60% or more, and at least one sheet of said rubber-filament fiber composite is disposed at said side wall portions in a vicinity of said carcass layer.

9. A pneumatic safety tire according to claim 8, wherein an aspect ratio of said tire is 60% or more, a rubber reinforcing layer having a crescent-shaped cross-section is disposed at an inner side of said carcass layer, and at least one sheet of said rubber-filament fiber composite is disposed at an inner side of said rubber reinforcing layer which is disposed at the inside of said carcass layer.

10. A pneumatic safety tire according to claim 9, wherein at least one down carcass layer is additionally disposed between said side wall portions and an outer surface of said carcass layer.

11. A pneumatic safety tire according to claim 9, wherein in addition to being disposed at the inner side of said rubber reinforcing layer, said rubber-filament fiber composite is also disposed between said side wall portions and an outer surface of said carcass layer.

12. A pneumatic safety tire according to claim 11, wherein at least one down carcass layer is disposed between the outer surface of said carcass layer and said rubber-filament fiber composite which is disposed at the outer side of said carcass layer in the radial direction of said tire.

13. A pneumatic safety tire according to claim 8, wherein an aspect ratio of said tire is 60% or more, and at least one sheet of said rubber-filament fiber composite is positioned between said side wall portions and an outer surface of said carcass layer.

14. A pneumatic safety tire according to claim 13, wherein at least one down carcass layer is additionally disposed between the outer surface of said carcass layer and said rubber-filament fiber composite which is disposed at the outer side of said carcass layer in the radial direction of said tire.

15. A pneumatic safety tire according to claim 8, wherein 4 to 50% by weight of said rubber-filament fiber composite is the filament fibers, and the filament fibers are fibers which do not exhibit meltability when the tire is used under a run-flat condition.

16. A pneumatic safety tire according to claim 8, wherein the filament fibers do not exhibit meltability when the tire is used under a run-flat condition.

17. A pneumatic safety tire according to claim 8, wherein the filament fibers in said rubber-filament fiber composite do not exhibit meltability at 270° C. or lower.

18. A pneumatic safety tire according to claim 17, wherein the filament fibers are at least one type of fibers selected from the group consisting of polyester fibers, aramide fibers, and polyimide fibers.

19. A pneumatic safety tire according to claim 1, wherein said filament fibers have a diameter or a maximum cross-sectional dimension of 0.0001 to 0.1 mm, and said rubber-filament fiber composite has a thickness of 0.05 to 2.0 mm.

20. A pneumatic tire according to claim 1, wherein said at least one sheet of a rubber-filament fiber composite is obtained by a method in which an unvulcanized rubber composition of a sheet form is pressed to one or both faces of a non-woven fabric by using a press or a roll so that air contained inside the non-woven fabric is sufficiently replaced with the unvulcanized rubber composition.

21. A pneumatic tire according to claim 1, wherein said at least one sheet of a rubber-filament fiber composite is obtained by a method in which unvulcanized rubber is liquefied by using a solvent and applied to a non-woven fabric to provide the fabric with tackiness.

22. A pneumatic tire comprising:
   a pair of left and right ring-shaped bead cores:
   a carcass layer formed from layers in which a plurality of cords disposed parallel to each other are embedded in a covering rubber, both end portions of said carcass layer being folded over said bead cores and turned up such that said carcass layer is formed in an annular shape;

a multi-layer belt disposed at an outer side of said carcass portion in a radial direction of the tire;

an annular tread portion disposed at an outer side of said belt portion in the radial direction of the tire;

a pair of side wall portions disposed at sides of said tread portion;

wherein at least one sheet of a rubber-filament fiber composite formed from non-parallel organic filament fibers which do not exhibit meltability at a temperature of 270° C. or lower when the tire is used under a run-flat condition and a rubber component is disposed at said side wall portions in proximity to said carcass layer.

23. A pneumatic safety tire according to claim 2, wherein said rubber-filament fiber composite is disposed between said side wall portions and an outer surface of said carcass layer, and said rubber reinforcing layer is disposed at an inner side of said carcass layer and is positioned under shoulder portions of the tire.

* * * * *